(12) United States Patent
Ueno et al.

(10) Patent No.: US 7,010,545 B2
(45) Date of Patent: Mar. 7, 2006

(54) ENVIRONMENTAL LOAD CALCULATION SYSTEM, ENVIRONMENTAL LOAD CALCULATION METHOD, ENVIRONMENTAL LOAD INDICATION ARTICLE, ENVIRONMENT LOAD INDICATION METHOD, PROGRAM, AND MEDIUM

(75) Inventors: Takayoshi Ueno, Hirakata (JP); Hiroshi Onishi, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 331 days.

(21) Appl. No.: 10/239,677

(22) PCT Filed: Jan. 24, 2002

(86) PCT No.: PCT/JP02/00486

§ 371 (c)(1),
(2), (4) Date: Jan. 14, 2003

(87) PCT Pub. No.: WO02/059813

PCT Pub. Date: Aug. 1, 2002

(65) Prior Publication Data

US 2003/0144986 A1    Jul. 31, 2003

(30) Foreign Application Priority Data

Jan. 25, 2001  (JP)  .............................. 2001-017638
Aug. 28, 2001  (JP)  .............................. 2001-258562

(51) Int. Cl.
*G06F 17/30*    (2006.01)

(52) U.S. Cl. ................................ 707/103 R
(58) Field of Classification Search ................ 707/103
See application file for complete search history.

(56) References Cited

U.S. PATENT DOCUMENTS 5,852,560 A    12/1998  Takeyama et al.
5,878,433 A *   3/1999  Miyamoto .............. 707/103 R

FOREIGN PATENT DOCUMENTS

| EP | 964349 | 12/1999 |
|---|---|---|
| JP | 10-57936 | 3/1998 |
| JP | 10-198719 | 7/1998 |
| JP | 11-143366 A | 5/1999 |
| JP | 11-353384 | 12/1999 |
| JP | 2000-37684 | 2/2000 |
| WO | WO 01/84407 | 11/2001 |

OTHER PUBLICATIONS

Japanese International Search Report for PCT/JP02/00486, dated Mar. 26, 2002.
English translation of Japanese International Search Report for PCT/JP02/00486, dated Mar. 26, 2002.

* cited by examiner

*Primary Examiner*—Mohammad Ali
*Assistant Examiner*—Thanh-Ha Dang
(74) *Attorney, Agent, or Firm*—RatnerPrestia

(57) ABSTRACT

It has been difficult to advance reduction in load to be applied on the earth resource and the global environment. An environmental load assessment system comprising a server for storing as data (a) a unit environmental load of constituent materials constituting a product and (b) a load ratio of an environmental load of constituent materials constituting a reference product to a total environmental load of the reference product; component information terminals for inputting information relating to weights of constituent materials constituting an object product; the server for calculating a total environmental load of the object product based on the stored data and the inputted information.

10 Claims, 9 Drawing Sheets

```
ENVIRONMENTAL LOAD OF
PRODUCT ****

CO₂  =***kg

NOx  =***kg

SOx  =***kg
```

ENVIRONMENTAL LOAD CALCULATION SYSTEM, ENVIRONMENTAL LOAD CALCULATION METHOD, ENVIRONMENTAL LOAD INDICATION ARTICLE, ENVIRONMENT LOAD INDICATION METHOD, PROGRAM, AND MEDIUM

This application is a U.S. National Phase application of PCT International application PCT/JP02/00486.

TECHNICAL FIELD

The present invention relates to an environmental load calculation system, an environmental load calculation method, an environmental load indication article, an environmental load indication method, a program and a medium to be used for presuming/assessing loads that a product, for example, made up of a component (a product) or a plurality of components applies on the earth resources and the global environment.

BACKGROUND ART

Recently, developments of environment-conscious products such as an energy-saving design for reducing carbon dioxide output which is a global warming substance and a recycling-oriented design for promoting effective utilization of resource are becoming increasingly important.

Under such circumstances, a life cycle assessment (LCA) is noted as a method of quantitatively assessing an environmental load from raw material procurements to a disposal of a product and reflecting the environmental load on product designs for the purpose of reducing the environmental load. The environmental load is a quantified value of influences that an activity of an object of assessment exerts either directly or indirectly on the global environment (global atmosphere, hydrosphere, soil, etc.), and various items such as outputs of $CO_2$, $NO_x$ and $SO_x$ to the atmosphere, energy consumption, degree of influence on global warming are used for the evaluation.

In order to carry out the LCA of a product, it is necessary to understand an environmental load from a raw material procurement to a production of each of the components constituting the product. In order to find out an environmental load of each of the components, it is necessary to investigate quantities of substances as well as input and output of energy used for producing the component. Further, an activity for propelling the developments of environment-conscious products is beginning to start, by so using the environmental load as one of decision-making inducers as to support a decision about a purchase of a component among a plurality of candidate components to thereby use components each of which has a low environmental load for a product.

However, since various substances are inputted for the production of components, it is not easy to correctly understand relevant processes and, therefore, it has been difficult to propel the reduction in the loads to be applied on the earth resources and the global environment.

To be more specific, at a component production site, a plurality of components are produced at one time in many cases and, especially, it is difficult to find out information relating to each of the components such as an amount of used treatment agent which does not remain on the component and energy consumption.

Further, much labor is required for assessing an environmental load of a product which consists of many components since environmental loads of the respective components must be investigated for the assessment.

Furthermore, in the case of using the environmental load as one of the decision-making inducers for supporting decision about a purchase of a component among a plurality of candidate components, it is difficult for a component purchaser to obtain information of the environmental load of the component since maintenance of data for environmental loads of components to be sold is not sufficient at component sellers. Moreover, since it is difficult for each of the component sellers to find out a level of environmental load of the component that they sell with respect to those sold by competitor component sellers, the component sellers have difficulty in defining an object value and so forth for further reducing the environmental load.

DISCLOSURE OF THE INVENTION

In view of the problems in the art as mentioned above, an object of the present invention is to provide an environmental load calculation system, an environmental load calculation method, an environmental load indication article, an environmental load indication method, a program and a medium which can propel the reduction in the loads to be applied on the earth resource and the global environment.

One aspect of the present invention is an environmental load calculation system comprising:

a database of storing as data (a) a unit load to be applied on the environment of a constituent material constituting a product and (b) a load ratio of an environmental load of a constituent material constituting a reference product to a total environmental load of the reference product;

input means of inputting information relating to a weight of a constituent material constituting an object product;

calculation means of calculating a total environmental load of the object product based on the stored data and the inputted information.

Another aspect of the present invention is the environmental load calculation system, wherein the calculation of the total environmental load of the object product based on the stored data and the inputted information consists of (a) a calculation of the total environmental load of the object product based on an environmental load of the constituent material constituting the object product, which is calculated based on the unit load to be applied on the environment of the constituent material constituting the object product and the information relating to the weight of constituent material constituting the object product, and the load ratio of the environmental load of the constituent material constituting the reference product to the total environmental load of the reference product or (b) a calculation of the total environmental load of the object product based on a converted load to be applied on the environmental load per unit number of the constituent material constituting the object product, which is calculated based on the unit load to be applied on the environmental load of the constituent material constituting the object product and the load ratio of the environmental load of the constituent material constituting the reference product to the total environmental load of the reference product, and the information relating to the weight of the constituent material constituting the object product.

Still another aspect of the present invention is the environmental load calculation system, wherein the product is a component constituting a product;

the input means is provided in a terminal device provided at the manufacturer and/or the seller which is connected to the calculation means through a network; and the calculated total environmental load of the product is noticed to the terminal device or devices through the network.

Yet still another aspect of the present invention is the environmental load calculation system, wherein the product is a component constituting a product, the environmental load calculation system comprising additional information input means of inputting additional information relating to at least one of a production, use, transportation and disposal of the product; and data processing means of calculating the environmental load of the product based on the calculated total environmental load of the product and the inputted additional information.

Still yet another aspect of the present invention is the environmental load calculation system, wherein the unit load of the constituent material to be applied on the environment is a unit load $U_{L,k}$ relating to an environmental load item L of constituent materials $A_k$ (k=an integer of 1 to m) of a product;

the load ratio is a load ratio $r_L$ relating to the environmental load item L of an environmental load of constituent materials constituting a reference product to a total environmental load of the reference product;

the information relating to a weight is weights $a_k$ (k=an integer of 1 to m) of the constituent materials $A_k$;

the calculation of the total environmental load of the object product based on the stored data and the inputted information consists of (a) a calculation of an environmental load PL relating to the environmental load item L of the constituent materials constituting the product from $$P_L = \Sigma_{k=1}^{m}(a_k \times u_{L,k}) \quad \text{(Equation 1)}$$

and a calculation of a total environmental load of the product $T_L$ relating to the environmental load item L from $$T_L = P_L/r_L \quad \text{(Equation 2)}$$

or (b) a calculation of a converted environmental load $u_{L,k}'$ relating to the environmental load item L of the constituent materials constituting the product from $$u_{L,k}' = u_{L,k}/r_L \quad \text{(Equation 3)}$$

and a calculation of the total environmental load of the product relating to the environmental load item L from $$T_L = \Sigma_{k=1}^{m}(a_k \times u_{L,k}') \quad \text{(Equation 4)}$$

A further aspect of the present invention is the environmental load calculation system, wherein the unit load of the constituent material to be applied on the environment is a unit load $u_{L,max}$ relating to an environmental load item L of a constituent material $A_{max}$ having a highest ratio of weight among constituent materials of a product;

the load ratio is a load ratio $r2_L$ relating to the environmental load item L of the environmental load of the constituent material $A_{max}$ having the highest ratio to the total environmental load of the reference product;

the information relating to a weight is a weight $a_{max}$ of the constituent material $A_{max}$ having the highest ratio;

the calculation of the total environmental load of the reference product based on the stored data and the inputted information consists of (a) a calculation of the environmental load relating to the environmental load item L of the constituent materials constituting the product from $$P2_L = a_{max} \times u_{L,max} \quad \text{(Equation 5)}$$

and a calculation of the total environment load relating to the environmental load item L of the product from $$T2_L = P2_L/r2_L \quad \text{(Equation 6)}$$

or (b) a calculation of a converted environmental load $u_{L,max}'$ relating to the environmental load item L per unit load of the constituent materials constituting the product from $$u_{L,max}' = u_{L,max}/r2_L \quad \text{(Equation 7)}$$

and a calculation of the total environmental load of the product relating to the environmental load item L from $$T2_L = a_{max} \times u_{L,max}' \quad \text{(Equation 8)}$$

A still further aspect of the present invention is the environmental load calculation system, wherein the unit load of the constituent material to be applied on the environment is a unit load $u_{L,total}$ of a total of the constituent materials $A_{total}$ of a product relating to an environmental load item L;

the load ratio is a load ratio $r3_L$ relating to the environmental load item L of the environmental load of a constituent material constituting the reference product to the total environmental load of a reference product;

the information relating to a weight is a weight $a_{total}$ of the total of the constituent materials $A_{total}$;

the calculation of the total environmental load of the object product based on the stored data and the inputted information consists of (a) a calculation of the environmental load relating to the environmental load item L of the constituent material constituting the product from $$P3_L = a_{total} \times u_{L,total} \quad \text{(Equation 9)}$$

and a calculation of the total environmental load $T3_L$ relating to the environmental load item L of the product from $$T3_L = P3_L/r3_L \quad \text{(Equation 10)}$$

or (b) a calculation of the converted environmental load relating to the environmental load per unit number $u_{L,total}'$ of the constituent material constituting the product from Equation 11

$$u_{L,total}' = u_{L,total}/r3_L \quad \text{(Equation 11)}$$

and a calculation of the total environmental load $T_L$ of the product relating to the environmental load item L from $$T3_L = a_{total} \times u_{L,total}' \quad \text{(Equation 12)}$$

A yet further aspect of the present invention is an environmental load calculation method comprising:

a first step of inputting as data (a) a unit environmental load of a constituent material constituting a product and (b) load ratio of an environmental load of a constituent material constituting a reference product to a total environmental load of the reference product;

a second step of inputting information relating to a weight of a constituent material constituting an object product; and a calculation step of calculating a total environmental load of the object product based on the inputted data and the inputted information.

A still yet further aspect of the present invention is an environmental load indication article of indicating a total environmental load of a product obtained by the use of the environmental load calculation system or the environmental load calculation method.

An additional aspect of the present invention is an environmental load indication method of indicating a total environmental load of a product obtained by the use of the environmental load calculation system or the environmental load calculation method on the product or through a network.

A still additional aspect of the present invention is a program to be used for executing whole or part of the first step of inputting as data (a) a unit environmental load of a constituent material constituting a product and (b) load ratio of an environmental load of a constituent material constituting a reference product to a total environmental load of the reference product, the second step of inputting information relating to a weight of a constituent material constituting an object product, and the calculation step of calculating a total environmental load of the object product based on the inputted data and the inputted information by way of a computer.

A yet additional aspect of the present invention is a medium which carries the program, the medium being processable by a computer.

Figure 1:
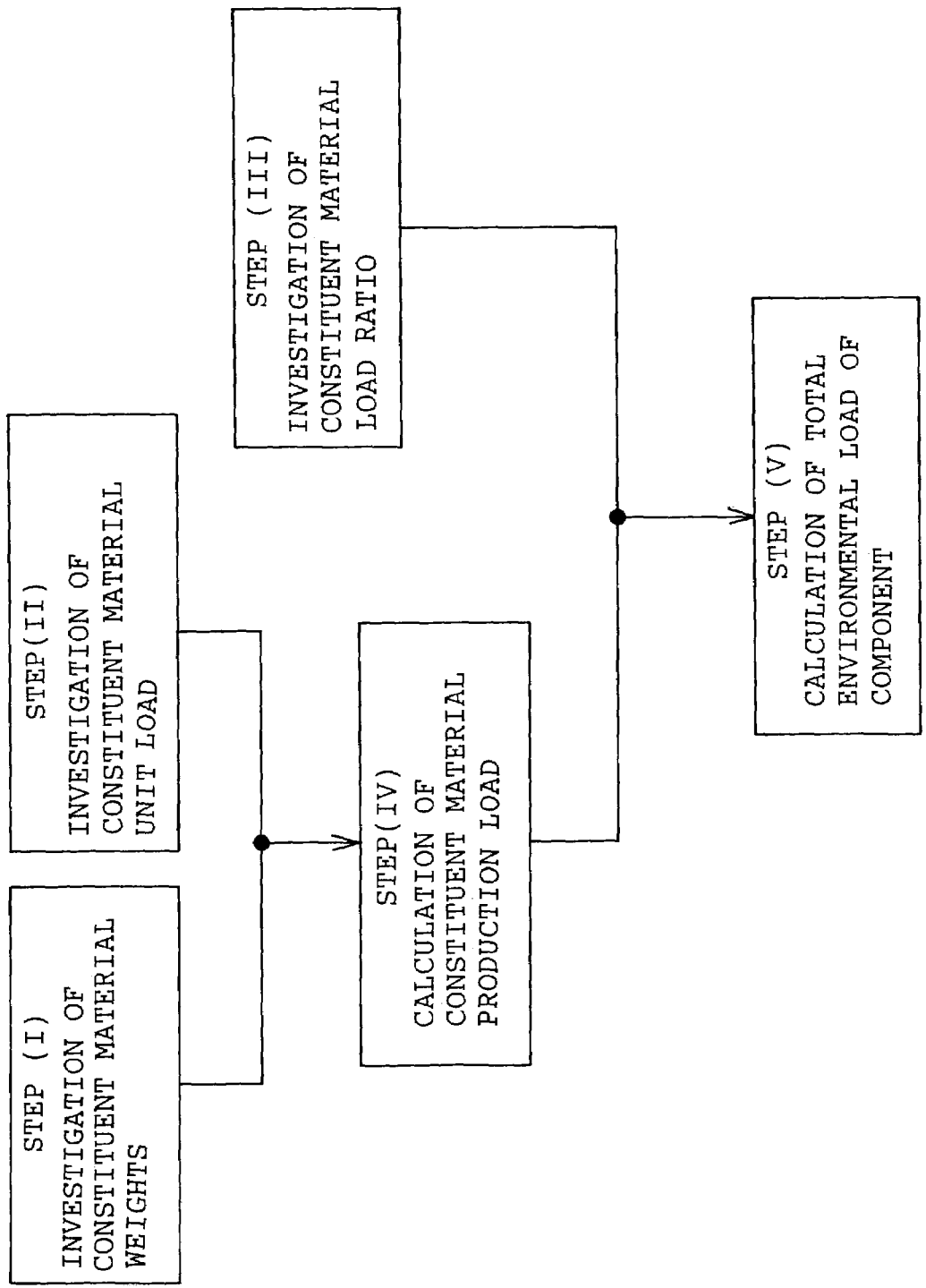
FIG. 1 is an illustration of an environmental load assessment method according to a first mode of embodiment of the present invention.

REFERENCE NUMERALS 11 range of productions of constituent materials
12 range of productions of treatment agents
13 range of productions of power sources
14 range of a production of a component
15 range of raw material procurements to a production of a component according to the present invention
21 network
31–33 component information terminals
34–36 component seller terminals
41 server
51 and 52 assessor terminals
61 indication article

BEST MODE FOR CARRYING OUT THE INVENTION

Hereinafter, modes of embodiment according to the sent invention will be described with reference to drawings.

(First Mode of Embodiment)

Firstly, an environmental load assessment method according to a first mode of embodiment will be described with reference to FIG. 1 which is the illustration of the environmental load assessment method of the first mode of embodiment. The environmental load assessment method of the present mode of embodiment corresponds to the environmental load calculation method of the present invention.

Information relating to weights of constituent materials may sufficiently be expressed by any of the physical quantities corresponding to a unit load such as mass, weight and volume. For example, if a constituent materials to be used is a wire, or a plate each having a defined cross-sectional configuration, it is possible to use length, area and the like as the physical quantitiy. Therefore, although a case of using the weight will be described below, it is apparent that the present invention is not limited thereto.

In Step (I), weights of constituent materials of a component (hereinafter referred to as "constituent material weights") to be inputted for a production of the component (product) are investigated.

In Step (II), a total environmental load from material procurements to productions of the constituent materials per unit weight (hereinafter referred to as "constituent material unit load") is investigated.

Investigated in Step (III) is a load ratio (hereinafter referred to as "constituent material load ratio") which indicates a ratio of a total environmental load from the raw material procurements to the productions of the constituent materials to a total environmental load from the raw material procurements to the production of the component.

After that, in Step (IV), from the constituent material weights and the constituent material unit load which are obtained in Step (I) and Step (II), a load (hereinafter referred to as "constituent material (production) load") relating to the constituent materials, i.e., the total environmental load from the raw material procurements to the productions of the constituent materials, is calculated.

After that, in Step (V), the total environmental load (hereinafter referred to as "(component) total environmental load"), which is a total of loads applied on the environment due to the raw material procurements to the production of the component, is presumed and assessed from the constituent material load and the constituent material load ratio which are obtained in Step (IV).

The environmental load assessment of component, which is an object of the present invention, will be described in more details below.

An environmental load relating to a production of a component can be classified into four categories, i.e., an environmental load relating to constituent materials of a component, an environmental load relating to treatment agents used in the production processes and not remaining on the component, an environmental load relating to power sources used for the production of the component, and an environmental load caused by those other than the power sources in the production of the component.

For example, in a production of a printed circuit board, which is one of the components of an electrical product, an epoxy resin, a glass fiber, a copper foil and the like are used as the constituent materials; hydrochloric acid, sodium hydroxide and the like are used as the treatment agents; and electric power and heavy oil are used as the power sources, and waste acid and waste alkaline are generated at the time of fabricating the printed circuit board.

Figure 2:
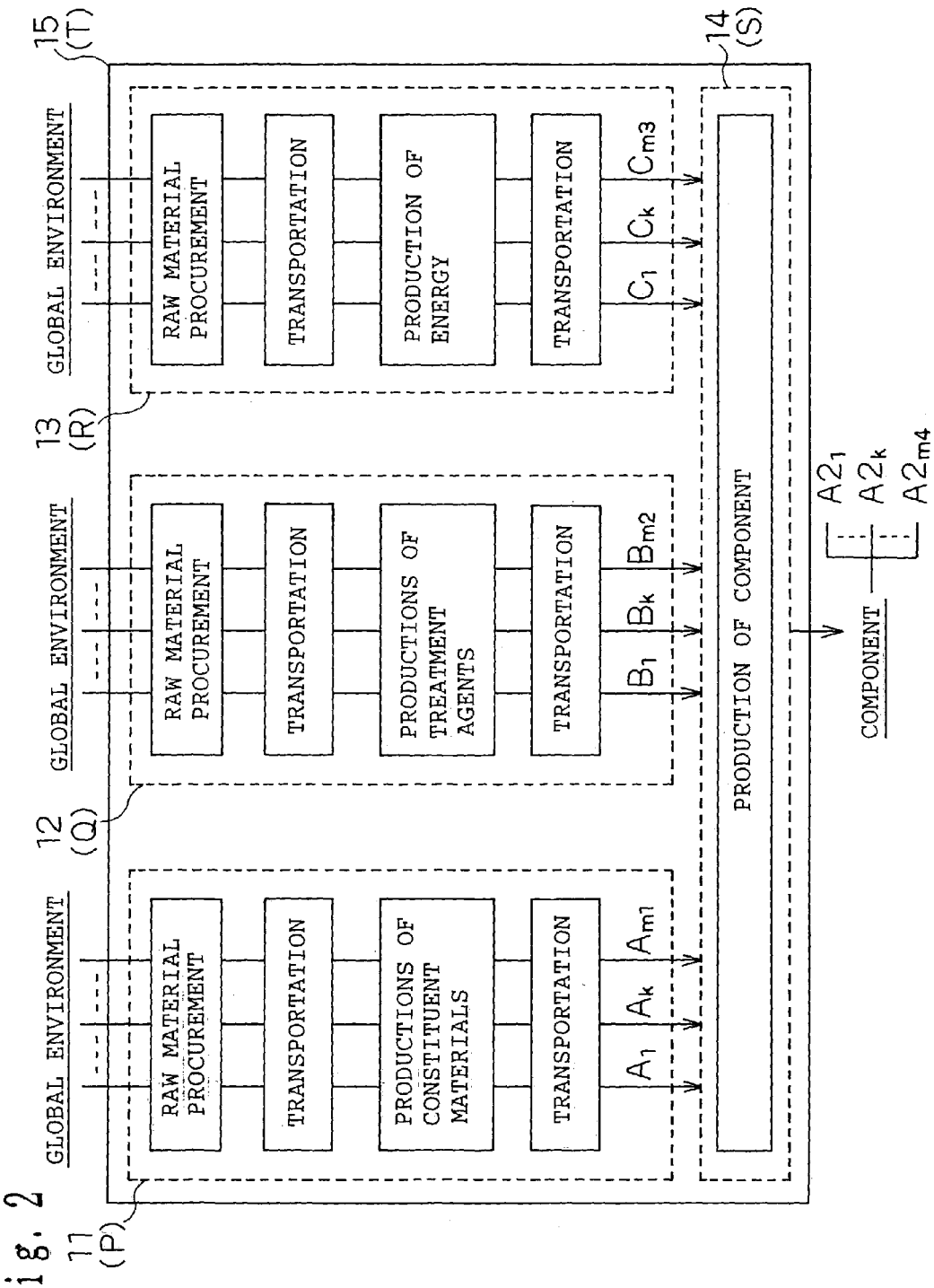
FIG. 2 is a conceptual diagram illustrating a flow of a production of a component according to the first mode of embodiment of the present invention.

As shown in FIG. 2, which is the conceptual diagram illustrating a flow of a production of a component, constituent materials $A_k$ (k=an integer from 1 to m1), treatment agents $B_k$ (k=an integer from 1 to m2), and power sources $C_k$ (k=an integer from 1 to m3) are used in order to produce the component whose constituent materials are indicated by $A2_k$ (k=an integer from 1 to m4).

At this time, taking exploitation of resources from the global environment as a starting point, a total environmental load P of a range 11 (see FIG. 1) of productions of the constituent materials, a total environmental load Q of a range 12 (see FIG. 1) of productions of the treatment agents, a total environmental load R of a range 13 (see FIG. 1) of productions of the power sources and a total environmental load S of a range 14 (see FIG. 1) of production of the component are generated.

The constituent material load in the present mode of embodiment corresponds to P, and the total environmental load T from the raw material procurements to the production of the component in the present mode of embodiment corresponds to a total of P, Q, R and S whose object is a range 15 (see FIG. 1). Note that, in the following descriptions, a suffix L is added to values (as described in the following, specific examples of the item include energy consumption) in order to clarify that the values relate to the environmental load item L.

Generally, in order to presume/assess the total environmental load from the raw material procurements to the production of a component, it is necessary to investigate information relating to the component.

As the weight $a_k$ of a constituent material $a_k$ in a component is an important item for determining performance and specification of the component at the manufacturer's side, the information about $a_k$ has been obtained in detail and is under control for each of the specific component. Therefore, the information about $a_k$ for each of the specific components is readily obtainable from component manufacturers.

On the other hand, at a production site, since a plurality of components are produced at one time in most cases, it is at present difficult to find out detailed information for each of the respective components with respect to treatment agents $B_k$ which do not remain on the components, quantities used of the power sources $C_k$ and a total environmental load S for a production of each of the components.

The inventors of the present invention have noted the fact mentioned above to find that it is possible to effectively carry out an environmental load assessment of a component by making a presumption of a total environmental load from raw material procurements to a production of the component by the use of information of constituent materials of the component for which information can be obtained with relative ease. The environmental load assessment of component will be described in detail below.

Figure 3:
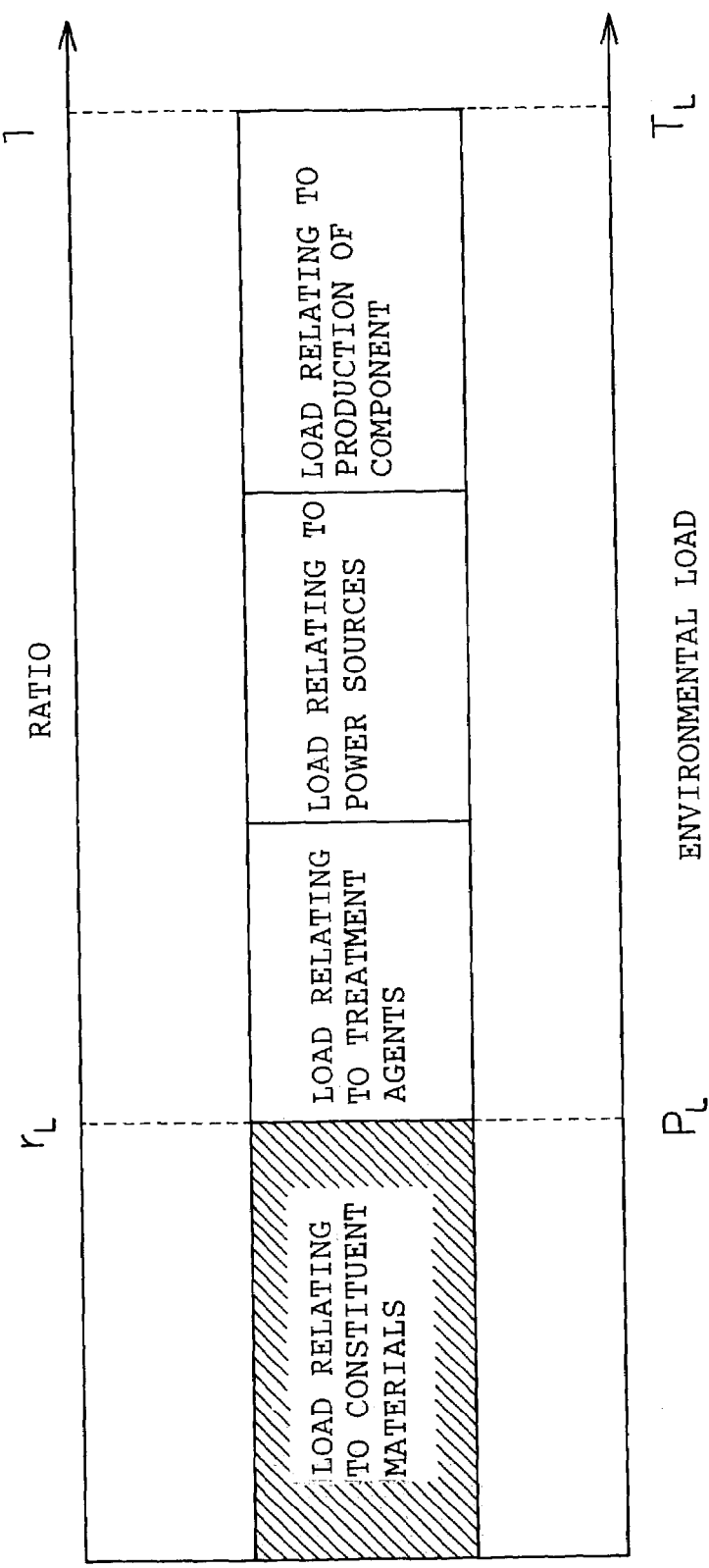
FIG. 3 is a conceptual diagram illustrating an assessment of an environmental load of a component according to the first mode of embodiment of the present invention.

As shown in FIG. 3, which is the conceptual diagram illustrating an assessment of an environmental load of a component, a total environmental load $T_L$ relating to an environmental load item L from raw material procurements to a production of the component consists of total environmental loads from raw material procurements to productions of constituent materials, treatment agents and power sources. The total environmental load $T_L$ is presumed and assessed according to the following equation (Equation 2) using a total environmental load $P_L$ from the raw material procurements to the production of the constituent materials and a ratio $r_L$ of the component to the total environmental load $T_L$.

$$T_L = P_L / r_L \quad \text{(Equation 2)}$$

Here, it is desirable to use a value obtained by investigating actual processes of the raw material procurements to the productions of the constituent materials $A_k$ as the constituent material load ratio $r_L$ relating to the environmental load item L; however, generic data or presumption data may be used in the present invention as long as the data are objective and reflect the current situation to persuade a third person. Examples of the usable data enough include publicized or official literature such as official data of a nation or a public organization, publicized data of a trade association, data of a nongovernmental institution, data of a foreign government and institution. Also, taking a factory manufacturing a plurality of types of components as an object wherein components to be assessed do not differ much in production process, data obtained by tabulating inputted substances/outputted substances and a total input of energy of the whole factory and distributing the tabulation result to the components to be assessed based on a production amount, a production cost, a production number and so forth of each of the components, may be used as presumption data.

The constituent material load $P_L$ relating to the environmental load item L in the present mode of embodiment is an addition of products of a material weight $a_k$ and a constituent material unit load $u_{L,k}$ of each of the constituent materials $A_k$ as indicated by the following equation (Equation 13).

$$P_L = \Sigma_{k=1}^{m1}(a_k \times u_{L,k}) \quad \text{(Equation 13)}$$

Here, the constituent material unit load $u_{L,k}$ is a total environmental load per unit weight of the constituent materials $A_k$ from the raw material procurements to the productions of the constituent materials $A_k$. It is desirable to use a value obtained by an investigation of actual processes from the raw material procurements to the productions of the constituent materials $A_k$ as the constituent material unit load $u_{L,k}$; however, generic data or presumption data may be used in the present invention as long as the data are objective and reflect the current situation to persuade a third person. Examples of the usable data include publicized or official literature such as official data of a nation or a public organization, publicized data of a trade association, data of a nongovernmental institution, data of a foreign government and institution.

Thus, the total environmental load $T_L$ relating to the environmental load item L is calculated from (Equation 2) and (Equation 13).

In short, it has been found that the total environmental load of an object product can be calculated by (1) calculating an environmental load of constituent materials constituting the object product, which is obtained based on a unit environmental load of the constituent materials constituting the object product and information relating to weights of the constituent materials constituting the object product and (2) based on the calculated environmental load of the constituent materials constituting the object product and a load ratio of an environmental load of constituent materials constituting a reference product to a total environmental load of the reference product.

Figure 4:
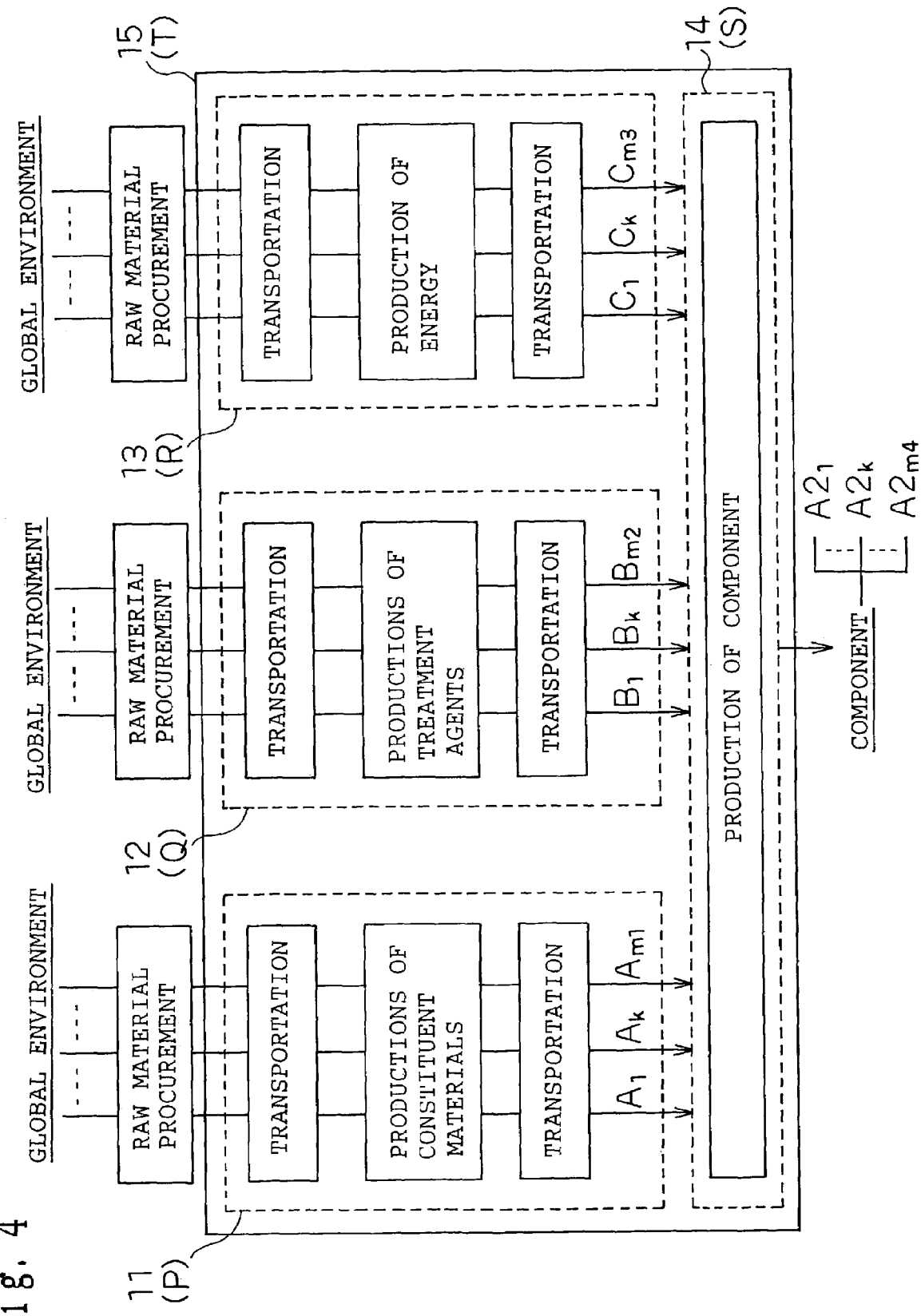
FIG. 4 is a conceptual diagram illustrating a flow of a production of a component which does not include raw material exploitations as an object of assessment according to the first mode of embodiment of the present invention.

In addition, a range to be used as the assessment object can be set properly in accordance with a purpose of the assessment to be carried out. Here, five steps of the procurements of resources, transportation, productions of constituent materials, transportation and a production of a component are used as the assessment object ranges (see FIG. 2); however, as shown in FIG. 4, it is also possible to exclude the exploitation of the resources from the assessment objects using the steps coming after that as the ranges of assessment objects. Note that FIG. 4 is the conceptual diagram illustrating a flow of a production of a component in the case where the procurements of resources are excluded from the assessment objects.

Further, it is also possible to estimate a range (variation) of values of the total environmental load of a component, which are obtained in Step V, by investigating a latitude (upper limit and lower limit) of values of the constituent material load $P_L$ or the constituent material load ratio $r_L$.

The weights of the constituent materials $A_k$ inputted for the productions of components per unit number are used as the weights of the constituent materials $A_k$ in Step (I); however, it is also possible to use weights of the constituent materials $A_k$ which are actually used for the components per unit number as the weights of the constituent materials $A_k$. In this case, although the degree of precision in the assessment result may be degraded if the weights of the constituent materials inputted for the production of components do not conincide with the weights of constituent materials used for the produced components, it is possible to perform Step (I) efficiently since it is relatively easy to obtain the weights of the constituent materials of the produced components.

(Second Mode of Embodiment)

An environmental load assessment method of the second mode of embodiment will be described below.

The environmental load assessment method of the second mode of embodiment is almost the same as the environmental load assessment method of the first mode of embodiment described above, except that a constituent material $A_{max}$ which has the highest weight ratio among constituent materials inputted for a production of a component per unit number or a weight $a_{max}$ which is a weight of the constituent material $A_{max}$ having the highest weight ratio among the constituent materials inputted for the production of the component per unit number is investigated in Step (I) of the present mode of embodiment.

Then, in Step (II), a total environmental load $T_L$ from a raw material procurement to the production of the component is presumed and assessed by investigating a constituent material unit load $u_{L,max}$ relating to the main constituent material which indicates a total environmental load relating to an environmental load item L from a raw material procurement to a production of the main constituent material $A_{max}$.

Figure 5:
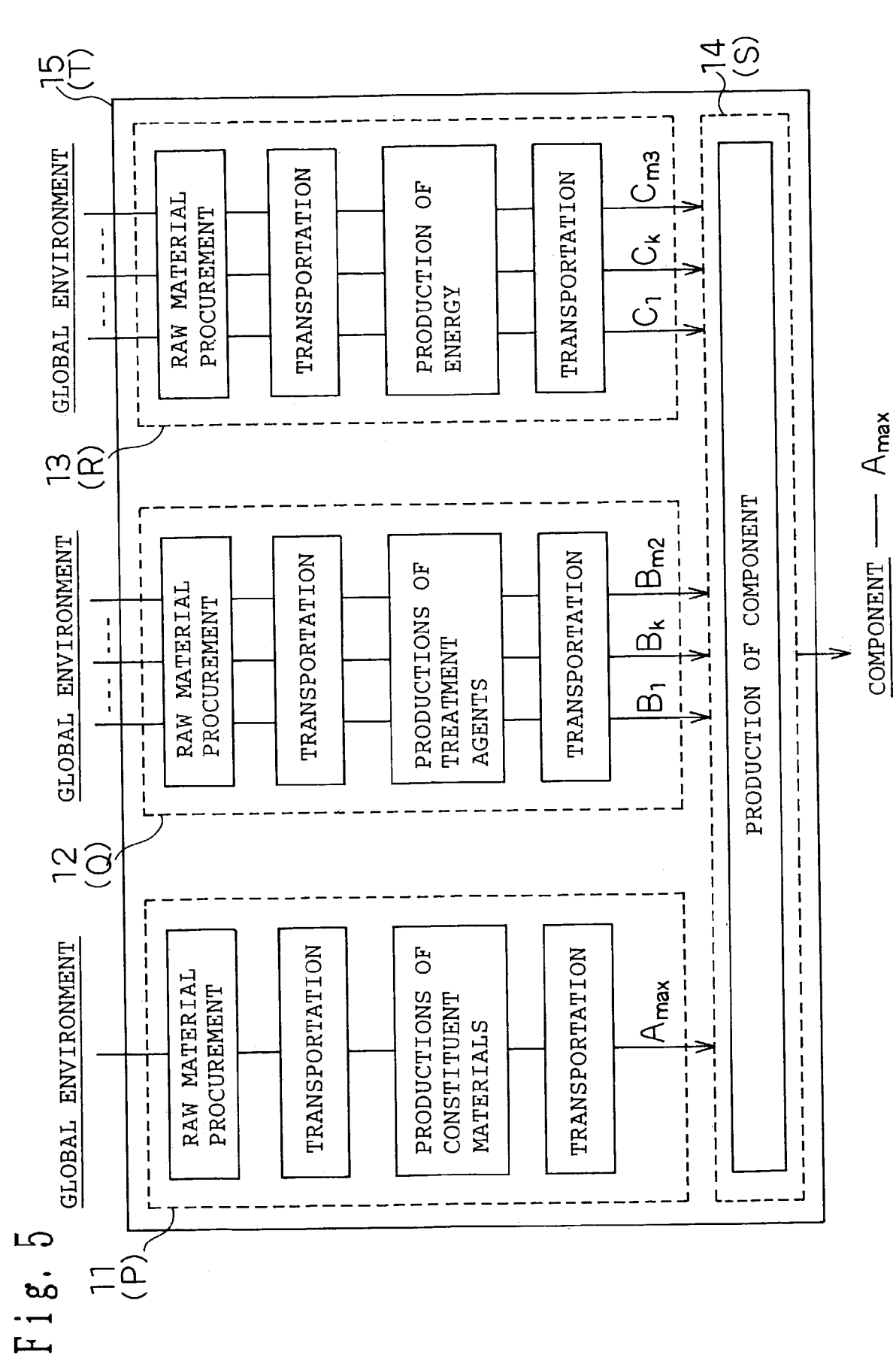
FIG. 5 is a conceptual diagram illustrating a flow of a production of a component according to a second mode of embodiment of the present invention.

As shown in FIG. 5, which is the conceptual diagram illustrating a flow of a production of a component in the present mode of embodiment, degree of precision in the assessment result is degraded to be lower than that obtained in the first mode of embodiment described above since not all of the constituent materials of the component are considered. However, with respect to a component having a relatively high weight ratio of the main constituent material $A_{max}$, the degradation in precision of assessment result is reduced and Step (I) is performed efficiently.

(Third Mode of Embodiment)

A configuration and an operation of an environmental load assessing system of a third mode of embodiment will be described below with reference to FIG. 6 which is the conceptual diagram of the environmental load assessing system of the third mode of embodiment.

Figure 6:
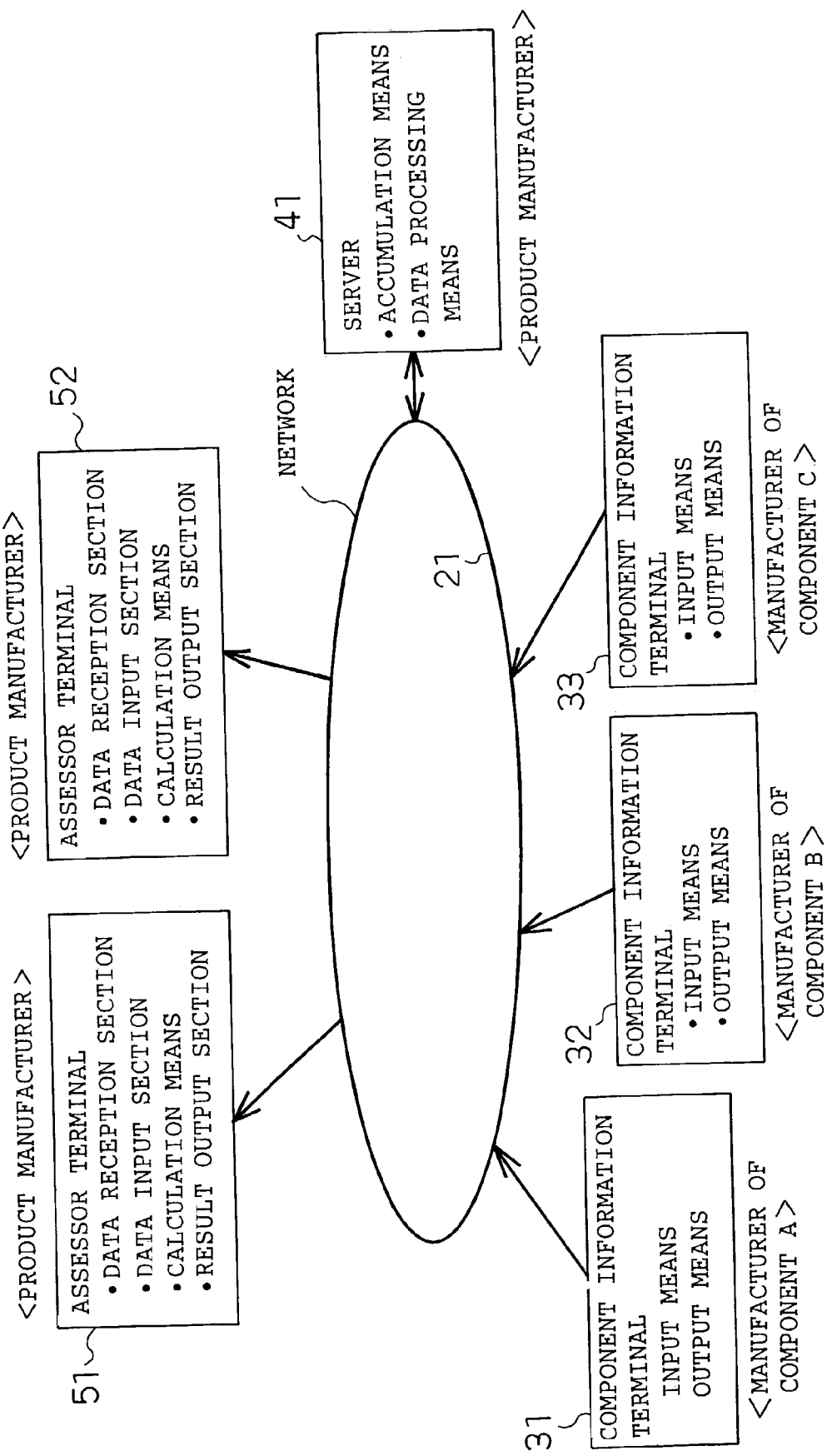
FIG. 6 is a conceptual diagram showing an environmental load assessing system according to a third mode of embodiment of the present invention.

In FIG. 6, component information terminals 31 to 33, a server 41 and assessor terminals 51 and 52 are connected through a network 21. Note that the environmental load assessing system of the present mode of embodiment corresponds to the environmental load calculation system of the present invention.

Weights of constituent materials of components included in a product are inputted from component manufacturers A to C to the component information terminals 31 to 33 respectively by using input means, and then the inputted information is outputted to the server 41 by using output means.

The server 41 has accumulation means of accumulating data containing at least constituent material unit loads, constituent material load ratios and constituent material weights, data processing means of performing data processing indicated by (Equation 2) and (Equation 13) described above and output means (not shown) of outputting results of total environmental loads of the components which are obtained by the data processing means to the assessor terminals 51 and 52.

Each of the assessor terminals 51 and 52 has a data reception section of receiving from the server 41 the constituent material unit loads, the constituent material load ratios and the constituent material weights of the components, a data input section of inputting information (information for product assembly, information for product transportation, information for product use, information about product disposal, etc.) required for assessing the product and calculation means of calculating a total environmental load from raw material procurements of the product to a disposal of the product in order to assess the total environmental load from the raw material procurements of the product to the disposal of the product.

As described above, it is generally necessary for the component suppliers/manufacturers to disclose all the information of the constituent materials, treatment agents and energy to the product manufacturers for the assessment of the total environmental load from the raw material procurements of the product to the disposal of the product. However, in the present mode of embodiment, since the total environmental load from the raw material procurements of a component to the production of the component is presumed and assessed using constituent materials of the component, the component manufacturers are required to disclose nothing more than the information regarding the constituent materials, thereby reducing workload of the information disclosure otherwise applied to the component manufacturers.

In addition, although the accumulation means and the data processing means are provided in the server 41 of the product manufacturer in the present mode of embodiment (see FIG. 6), the accumulation means and the data processing means are not necessarily provided at the product manufacturer. For example, the accumulation means and the data processing means may be provided at each of the component manufactures A to C so that the total environmental loads of components are calculated respectively at the component manufacturers and results thereof are outputted to the product manufacturers. Further, it is also possible to provide the accumulation means and the data processing means at other organizations which have the server 41 than the product manufacturer.

(Fourth Mode of Embodiment)

A configuration and an operation of a component purchase support system of a fourth mode of embodiment will be described below with reference to FIG. 7 which is the conceptual diagram of the component purchase support system of the fourth mode of embodiment.

Figure 7:
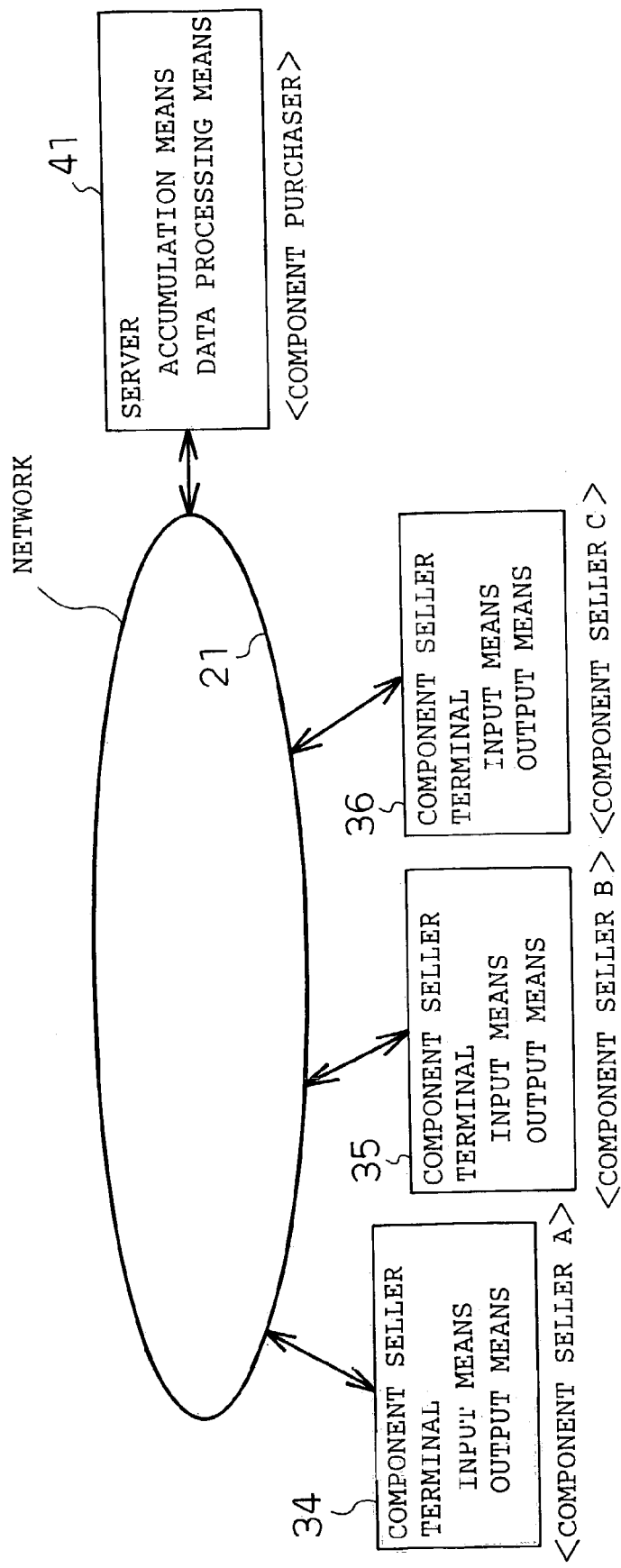
FIG. 7 is a conceptual diagram showing a component purchase support system according to a fourth mode of embodiment of the present invention.

In FIG. 7, component seller terminals 34 to 36 and a component purchaser server 41 are connected through a network 21. The component seller terminals 34 to 36 are terminals provided at the component sellers A to C who supply components which are in demand of the component purchaser. Note that the component purchase support system of the present mode of embodiment corresponds to the environmental load calculation system of the present invention.

Weights of constituent materials of components are inputted to the component seller terminals 34 to 36 using input means respectively by the component sellers A to C and then the information is outputted to the server 41 using output means.

In the case where each of the component sellers has assessed a total environmental load from raw material procurements to a production of a component to be sold, the total environmental load may be inputted using the input means and then the information may be outputted to the server 41 using the output means.

Thus, the component sellers output the information of the weights of constituent materials of component or the information of the total environmental load of component which has been assessed in advance to the server at the component purchaser.

In general, in the case where the component sellers do not have the assessment result of the total environmental load from the raw material procurements to the production of the component to be sold, it is necessary for the component sellers to disclose all the information of the constituent materials, treatment agents and energy to the product manufacturers. However, in the present mode of embodiment, since the total environmental load from the raw material procurements to the production of the component is presumed and assessed based on the constituent materials as described above, the component manufacturers should disclose nothing more than the information of the constituent materials to thereby reduce workload of the information disclosure at the component manufacturers.

As in the same manner as the third mode of embodiment, the server 41 is provided with an accumulation means of accumulating data including at least the unit loads, the load ratios and the weights concerning the constituent materials or the total environmental loads of the components outputted from the component sellers.

Concerning the accumulated data including at least the unit loads, the load ratios and the weights of materials concerning the constituent materials, the total environmental loads of the object components are calculated by a data processing means which is capable of performing data processing shown in Equations 2 and 13.

The results of the total environmental loads of components which are sold by the component sellers are fed back automatically to the component sellers from the server 41.

Thus, since each of the component sellers can find out not only the total environmental load of the component that they sell but also results of the total environmental loads of components sold by competitor component sellers, it is possible to obtain the effects that they can comprehend a position of the component they sell in terms of the environmental load to precisely set up an object value for reduction in the environmental load.

In addition, the accumulation means and the data processing means in the present mode of embodiment are provided in the server 41 of the component purchaser (see FIG. 7). However, the accumulation means and the data processing means is not necessarily provided at the component purchaser side. For example, the accumulation means and the data processing means may be provided at each of the component manufacturers A to C so that the total environmental load of each of the components is calculated using the accumulation means and the data processing means at each of the component manufacturers to output the result to the component purchaser. Further, it is also possible to provide the accumulation means and the data processing means at other organizations which have the server 41 than the component purchaser.

(Fifth Mode of Embodiment)

An environmental load assessment method of a fifth mode of embodiment will be described below.

The environmental load assessment method of the fifth mode of embodiment is almost the same as that of the first mode of embodiment described above except that a weight $a_{total}$ of a constituent material $A_{total}$ which is used for productions of components per unit number (virtual constituent material obtained by averaging all the constituent materials used for the productions of the components) is investigated in Step (I) of the present mode of embodiment.

Then, in Step (II), a constituent material unit load $u_{L,total}$ of the constituent material $A_{total}$, which indicates a total environmental load relating to an environmental load item L from a raw materials procurement to a production of the constituent material $A_{total}$ per unit weight, is investigated to calculate an environmental load $P3_L$ of constituent materials constituting a component using the following equation:

$$P3_L = a_{total} \times u_{L,\,total} \qquad \text{(Equation 9)}$$

and then a total environmental load $T3_L$ relating to the environmental load item L of a product is calculated using the following equation:

$$T3_L = P3_L / r3_L \qquad \text{(Equation 10)}$$

in order to presume and assess the total environmental load $T3_L$ from the raw material procurements to the productions of the components. In the present mode of embodiment, since Step (I) includes only the measurements of the weights of the components which are assessment objects, the environmental loads are calculated efficiently.

In Step (II), it is possible to obtain an assessment result having the same level of precision as that achieved in the first mode of embodiment described above by using a correct value as the constituent material unit load $u_{L,total}$ (it is also possible to obtain, by investigation, the environmental constituent material unit load of constituent materials constituting a main component and to use the obtained value as the constituent material unit load $u_{L,total}$ of the assessment object product).

In addition, (Equation 11) and (Equation 12) can be integrated into the following equation.

$$\begin{aligned} T3_L &= (a_{total} \times u_{L,total}) / r3_L \qquad \text{(Equation 14)} \\ &= a_{total} \times (u_{L,total} / r3_L) \end{aligned}$$

The value $u_{L,total}/r3_L$ which is calculated from the constituent material unit load of the constituent material $A_{total}$ and the constituent material load ratio of a reference product corresponds to a converted load $u_{L,total}'$ from a procurement of raw materials of a product to a production of a component which is obtained by conversion into a load per unit number of the constituent materials.

Figure 10:
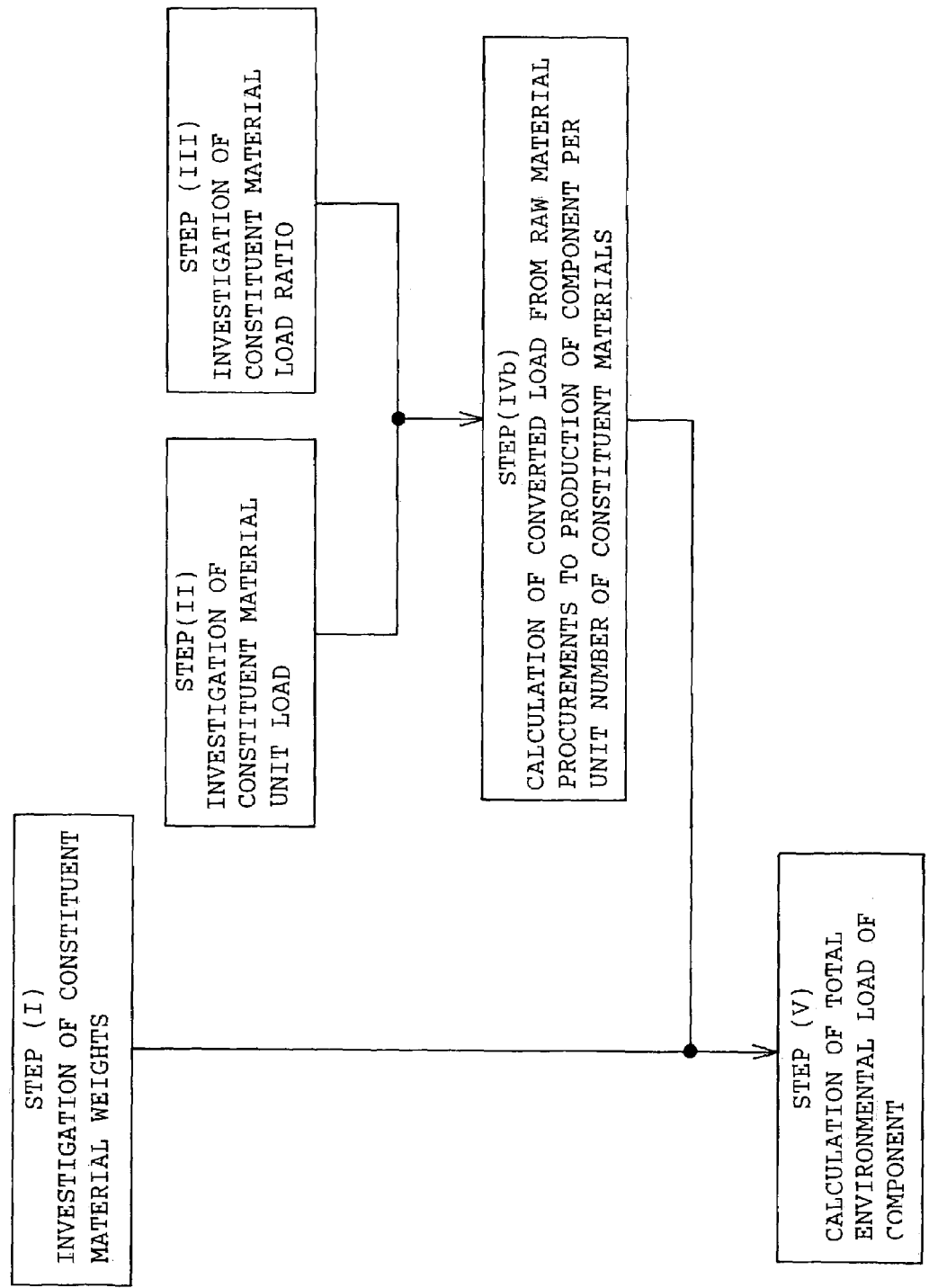
FIG. 10 is an illustration of an environmental load assessment method according to a fifth mode of embodiment of the present invention.

As shown in FIG. 10, it is possible to calculate the total environmental load $T_3$ of the object product in the latter half of Equation 14 after investigating the constituent material unit load $u_{L,total}$ and the constituent material load ratio $r3_L$ in Steps (II) and (III) and finding out the converted load unit $u_{L,total}'=u_{L,total}/r3_L$ per unit number of constituent materials in Step (IVb).

In short, it has been found that the total environmental load of the object product can be calculated by (1) calculating the converted environmental load per unit number of the constituent materials constituting the object product based on the unit environmental load of the constituent materials constituting the object product and the load ratio of the environmental load of the constituent materials constituting the reference product to a total environmental load of the reference product and (2) based on the calculated converted environmental load per unit number of the constituent materials constituting the object product which is calculated based on the unit environmental load of the constituent materials constituting the object product and the information relating to the weight of the constituent materials constituting the object product.

Of course, such method is applicable to the first and second modes of embodiment described above. For example, in the first mode of embodiment, it is possible to calculate the total environmental load $T_L$ of the object product after obtaining the converted load $u_{L,k}'=u_{L,k}/r_L$ from the procurement of raw materials to the production of the component which is obtained by conversion into a load per unit number of the constituent materials.

(Sixth Mode of Embodiment)

Figures 8, 9:
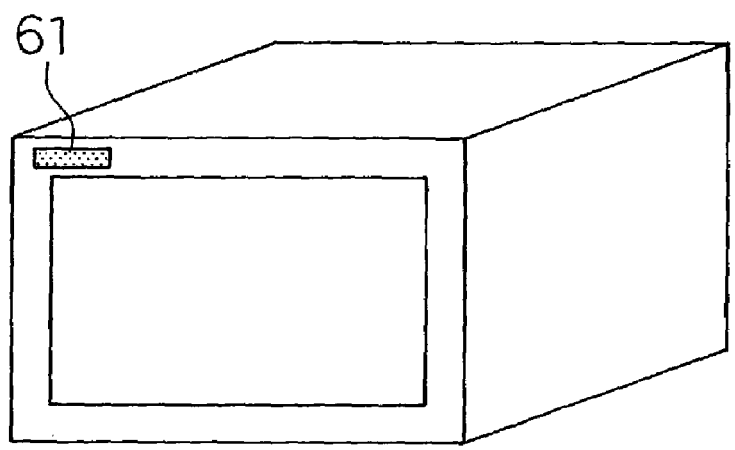
FIG. 8 is a conceptual diagram showing an indication article according to a sixth mode of embodiment of the present invention.
FIG. 9 is a conceptual diagram showing an indication article according to the fourth mode of embodiment of the present invention.

A label which is an example of an indication article obtained by using the environmental load calculation system (the environmental load calculation method) of the present invention is shown in FIG. 8. An environmental load of a product is indicated on the label so that a person considering a purchase of the product can readily confirm the contents. On the indication article, it is possible to indicate various information other than the environmental load, such as performance and specification of the product, and not only such label but also a tag which is typically attached to a product may be used as the indication article.

Further, the information relating to the environmental load may directly be written on the indication article, while it is possible to specify the information in other forms such as barcodes so that contents of the information are indicated when so required.

The information may be included in a catalogue of the product. In this case, usable modes include a catalogue of general leaflet type, a catalogue publicized on the Internet and so forth.

In short, the present invention includes (1) the environmental load indication article indicating a total environmental load of a product as described above and (2) the environmental load indication method used for indicating a total environmental load of a product on the product or through a network as described above.

EXAMPLE 1

A total environmental load from raw material procurements to a production of 0.1 m² of a printed circuit board which is used for a certain product was assessed in terms of an assessment item of energy consumption (this implies that the total environmental load is the energy consumption).

In step (I), It was found that 0.08 kg of an epoxy resin, 0.08 kg of a glass fiber and 0.16 kg of a copper foil were used for the production of 0.1 m2 of the printed circuit board. An investigation using a known database such as LCA was performed in Step (II). The results of the investigation reveals that each of the constituent material unit loads is: 102 MJ/kg for the epoxy resin; 16 MJ/kg for the glass fiber and 19 MJ/kg for the copper foil.

In Step (III), a constituent material ratio of 0.4 of a similar printed circuit board which had been obtained by previous investigation was used as a constituent material ratio.

A result obtained in Step (IV) was 12.5 MJ/(0.1 m² of printed circuit board), which was obtained from the above investigation results, and, in Step (V), it was presumed and assessed that the total environmental load relating to the energy consumption from the raw material procurements to the productions of the constituent materials of the printed circuit board, which was the object of assessment, was 31.3 MJ/(0.1 m₂ of printed circuit board).

EXAMPLE 2

A total environmental load from raw material procurements to a production of a semiconductor device which is used for a certain product was assessed in terms of an assessment item of $CO_2$ output to the atmosphere (this implies that the total environmental load is the $CO_2$ output)

In Step (I), it was found that amounts of constituent materials used were 0.001 kg for a lead frame, 0.005 kg of a mold resin and 0.0005 kg for a semiconductor substrate per semiconductor device. After that, an investigation using a known database such as LCA was performed in Step (II). It was found that the constituent material unit loads of the lead frame, the mold resin and the semiconductor substrate were 5.2 kg-$CO_2$/kg (which means $CO_2$ output per 1 kg of the lead frame was 5.2 kg; the same applies to the following values), 2.9 kg-$CO_2$/kg and 800 kg-$CO_2$/kg respectively.

In Step (III), a constituent material ratio of 0.08 was used. That is a mean value for the whole semiconductor factory based on investigation data of the whole substances and the whole energy used in the semiconductor factory.

A result obtained in Step (IV) was 0.42 kg-$CO_2$/(one semiconductor), which was obtained from the above investigation results, and, in Step (V), it was presumed and assessed that the total environmental load relating to the energy consumption from the raw material procurements to the production of the semiconductor, which was the assessment object, was 5.25-$CO_2$/(one semiconductor device).

EXAMPLE 3

A total environmental load from raw material procurements to a production of a cathode-ray tube which is used for a television was assessed in terms of an assessment item of energy consumption.

In Step (I), it was found that a constituent material having the highest weight in one cathode-ray tube was a glass and, therefore, the weight of the glass used for one cathode-ray tube as a finished product was 20 kg. After that, an investigation using a known LCA database and so forth was performed in Step (II). It was found that the constituent material unit load of the glass was 16 MJ/(1 kg of the glass).

In Step (III), an averaged constituent material load ratio of 0.4 of the whole cathode-ray tube industry which was obtained based on investigation data of the whole substances and the whole energy used for the cathode-ray tube industry was utilized.

A result obtained in Step (IV), which was obtained from the results of above investigation, was 320 MJ/(one cathode-ray tube), and, in Step (V), it was presumed and assessed that a total environmental load relating to energy consumption from raw material procurements to productions of constituent materials of the cathode-ray tube, which was the assessment object, was 800 MJ/(one cathode-ray tube).

EXAMPLE 4

A total environmental load of a television from raw material procurements to a disposal of the product was assessed in terms of an assessment item of energy consumption.

Weights of constituent materials of each of components used for the television were investigated using the Internet. Investigation results of the components were collected at a server using the Internet through component information terminals of component manufacturers.

The server accumulates constituent material ratios and constituent material unit loads of respective components, i.e., a cathode-ray tube, a semiconductor component, a receiving component, a connection component, a conversion component, a mechanism component and a housing. Energy consumption from raw material procurements to productions of the components was 1,700 MJ/(one television), which was obtained by using the accumulated data, constituent material weights collected at the server using the Internet from the component manufacturers and the constituent material ratios as well as the constituent material unit loads corresponding to the components.

Each of assessor terminals receives the energy consumption of 1,700 MJ/(one television) of the components calculated by the server, and then inputted thereto were energy consumption for product assembly of 240 MJ/(one television), energy consumption for product transportation of 60 MJ/(one television), energy consumption for product use of 25,000 MJ/(one television) and energy consumption for product disposal of 2 MJ/(one television) which had been separately investigated.

As a result, it was assessed that the energy consumption as the total environmental load from the raw material procurements to the disposal of the product was 2,7002 MJ/(one television).

Further, a label 61 on which the obtained environmental load of television was printed was attached to the television as an indication article as shown in FIG. 9.

EXAMPLE 5

Total environmental loads of three types of printed circuit boards respectively sold by sellers A, B and C from raw material procurements to disposals of the products were assessed for comparison in terms of energy consumption to be used as a reference data relating to a purchase of a printed circuit board to be used for a certain product.

Weights of the constituent materials or the total environmental loads of the printed circuit boards were investigated using the Internet respectively with respect to the sellers. Then, the investigation results of the components were collected at a server of a purchaser through the Internet starting from component information terminals of component manufacturers.

As a result, data of the weights of constituent materials of the printed circuit boards were sent from the sellers A and B. In turn, sent from the seller C was data of a total environmental load of the printed circuit board which was investigated independently by the seller C.

Total environmental loads for the sellers A and B, which were obtained by using a constituent material load ratio and a constituent material unit load corresponding to each of the printed circuit boards and based on the data of weights of constituent materials of the printed circuit boards sent from the sellers A and B, were 270 MJ/(1 m$^2$ of printed circuit board) and 330 MJ/(1 m$^2$ of printed circuit board), respectively. On the other hand, total environmental load sent from the seller C was 330 MJ/(1 m$^2$ of printed circuit board).

After that, the total environmental loads of the three printed circuit boards thus obtained were automatically fed back to each of the sellers A, B and C through the Internet.

EXAMPLE 6

A total environmental load from raw material procurements to productions of components of a chip resistor used for a certain product was assessed in terms of an assessment item of energy consumption.

In Step (I), it was found that a total weight of the whole constituent materials per chip resistor was 0.000005 kg. After that, Step (II) was performed using a mean constituent material unit load of 60 MJ/kg of the whole passive component industry, which was calculated based on investigation data of the whole substances and whole energy used for the whole passive component industry.

In Step (III), a mean constituent material load ratio of 0.05 of the whole passive component industry, which was calculated based on the investigation data of the whole substances and whole energy used for the whole passive component industry, was used.

A result obtained in Step (IV) was 0.0003 MJ/(one chip resistor), which was obtained from the above results of investigation, and, in Step (V), it was presumed and assessed that the total environmental load relating to the energy consumption from the raw material procurements of the chip resistor which was the object of assessment was 0.006 MJ/(one chip resistor).

In addition, it is also possible to calculate the total environmental load relating to the energy consumption for the chip resistor which was the object of assessment amounting 0.006 MJ/(one chip resistor) by calculating a converted load per mean constituent material unit number of the whole passive component industry of 1,200 MJ/kg from the constituent material unit load of 60 MJ/kg and the constituent material load ratio of 0.05, and then multiplying the value by the constituent weight per chip resistor of 0.000005 kg in Step (IVb) (see FIG. 10).

In the environmental load assessment method of the present invention, the object component (product) is not particularly limited. Examples of the component used in an electrical manufacture may be an electronic component such as a semiconductor component, a passive component, a connector component, a conversion component, a liquid crystal display device and a cathode-ray tube as well as a housing, a mechanism component, a recording medium and so forth.

The environmental load item of the present invention are not particularly limited so far as the item is of generic use and can be quantified. Examples of the item may be substances and energy used within a range of an assessment object or substances and energy outputted to the atmosphere, water, soil and so forth out of the range of the assessment object. In addition, energy consumption, $CO_2$ output is typically used as the environmental load item. It is also possible to use an assessment value of potential affect on the environment (e.g., a global warming index) which is obtained based on results of the substances and energy used within or exhausted from the range of the assessment object, as the environmental load item.

The information relating to the weights of the constituent materials of the present invention used in the modes of embodiment described above is the information about the information about weights of constituent materials. However, the information relating to weights of constituent materials of the present invention is not limited thereto, and information about capacities, lengths, areas may be used.

The load ratio of the present invention is, for example, (1) the constituent material load ratio in producing the similar printed circuit board which had been formerly investigated in above-described Example 1 where the printed circuit boards are produced, (2) the mean constituent material load ratio of the whole semiconductor factory which produces the semiconductor in above-described Example 2 where the semiconductor is produced or (3) the mean constituent material load ratio of the whole cathode-ray tube industry as described above in Example 3 where the cathode-ray tube is produced. However, the load ratio of the present invention is not limited thereto, so far as the load ratio is a ratio of an environmental load ratio of constituent materials constituting a reference product to a total environmental load of the reference product.

In Example 1, for example, the constituent material ratio in producing the similar printed circuit board which had been formerly investigated is considered as an approximate value which is considerably close to the constituent material ratio in producing the printed circuit board of Example 1. The reason therefor is that a production process of the printed circuit board in Example 1 and that of the similar printed circuit board formerly investigated are so similar to each other that they are considered to be similar in the load relating to constituent materials, treatment agents, power sources and component production (see FIG. 3). However, it is desirable to correctly measure the constituent material ratio for the production of the similar printed circuit board.

In Example 2, for example, the mean constituent material load ratio of the whole semiconductor factory is considered as a rough approximate value of the constituent material load ratio in producing the semiconductor of Example 2. The reason therefor is that the semiconductor factory produces relatively similar types of semiconductors and, therefore, they are considered to be similar in the load relating to constituent materials, power sources and component productions.

In Example 3, for example, the mean constituent material load ratio of the whole cathode-ray tube industry is considered as a rough approximate value of the constituent material ratio in producing the cathode-ray tube of Example 3. However, it is supposed that precision in such approximation is not always good since a plurality of manufacturers produce cathode-ray tubes using various components and production methods in the cathode-ray tube industry. Therefore, it is necessary to treat the mean constituent material ratio of the cathode-ray tube industry in the present invention as a rough order of magnitude. However, in the case where it is difficult to obtain direct information, the mean constituent material ratio as described above can be used effectively as one of reference values. The mean constituent material load ratio of the whole cathode-ray tube industry can be obtained with relative easey by rough estimation methods and can be used widely for calculating total environmental loads of various components and products in the cathode-ray tube industry.

The database of the present invention is the accumulation means at the server 41 (see FIG. 6 or 7) in the above-described Examples. However, the calculation means of the present invention is not limited thereto, and a plurality of cache servers connected to the Internet may be used as the calculation means.

The database is not essential. For example, (a) a unit environmental load of constituent materials constituting a product and (b) a load ratio of an environmental load of constituent materials constituting a product to a total environmental load of a reference product may be inputted by proper manual operations of a user when so required. For example, in the case of carrying out the above-described environmental load calculation method in a specific production field where a limited series of data are used, a simple system configuration which does not require a large-scale database is effectively used.

The input means of the present invention is provided only at the component information terminals 31 to 33 or the component seller terminals 34 to 36 (see FIG. 6) in above-described Examples. However, the input means of the present invention is not limited thereto, and an input device such as a keyboard provided at a general-purpose terminal connected to a network may be used as the input means.

The calculation means of the present invention is the data processing means at the server 41 (see FIG. 6 or 7) in above-described Examples. However, the calculation means of the present invention is not limited thereto, and a general-purpose high-speed supercomputer connected to a high-pass network may be used as the calculation means.

The additional information input means of the present invention is the data input section provided commonly at the assessor terminals 51 and 52 (see FIG. 6) in above-described Examples. However, the additional information input means is not limited thereto, and an input device such as keyboards provided separately may be used as the additional information input means.

The data processing means of the present invention is the arithmetic means commonly provided at the assessor terminals 51 and 52 (see FIG. 6) in above-described Examples. However, the data processing means of the present invention is not limited thereto, and personal computers provided separately may be used as the data processing means.

Thus, an environmental load calculation system comprising additional information input means of inputting additional information relating to at least one of product assembly, product use, product transportation and product disposal and data processing means of calculating environmental load of a product based on a calculated total environmental load of a product and the inputted additional information is of course encompassed by the present invention. It is possible to consider the production (e.g., assembly), use, transportation and disposal of a product as an integrated flow.

Further, the notice of the calculated total environmental load of product of the present invention is performed as the automatic feed back of the obtained total environmental loads of the three-types of printed circuit boards to the sellers A, B and C through the Internet in Example 5 described above. However, the notice of the calculated total environmental load of product of the present invention is not limited thereto, and the notice may be (1) a phone call to inform a total environmental load of a component to each of sellers who actually sold the component, (2) an e-mail to inform a total environmental load of a predetermined component to all subscribers on a mailing list which is managed by a trade association or (3) publication of total environmental loads of any components on a web page which is established by a public organization to those who wish to view the data. In short, the notice of the calculated total environmental load of product of the present invention may be sufficient so far as it is performed with respect to manufacturers and/or sellers of the component, and contents, a range, means of the notice may be arbitrary.

The invention includes a program used for executing functions of whole or part of means (apparatuses, elements, circuits, sections, or the like) of the environmental load calculation system of the present invention described above by way of a computer, the program operating in cooperation with the computer. Of course, the computer is not limited to pure hardware such as a CPU, and a firmware, an OS or those including peripheral devices may be used as the computer.

The invention includes a program used for executing operations of whole or part of steps (processes, operations, effects, or the like) of the environmental load calculation system and the environmental load indication method of the present invention described above by way of a computer, the program operating in cooperation with the computer.

"Part of means (apparatuses, elements, circuits, sections or the like) of the present invention" and "part of steps (processes, operations or effects, etc.) of the present invention" implies some means or steps of the plurality of means or steps or part of functions or operations of one of the means or the steps.

"Part of apparatuses (elements, circuits, sections) of the present invention" implies some apparatuses of the plurality of apparatuses, part of means (element, circuits and sections) of one of the apparatuses or part of functions of one of the means.

The present invention includes a recording medium which records the program of the present invention and can be read out by a computer. A mode of use of the program of the present invention may be such that the program is recorded on the recording medium to be read out by the computer and operates in cooperation with the computer. Another mode of use of the program of the present invention may be such that the program is transmitted through a transmission medium to be read out by the computer and operates in cooperation with the computer. Examples of the recording medium include a ROM, and examples of the transmission medium include the Internet and like transmission mediums as well as light, electric wave, sound wave.

The configuration of the present invention may be realized as software or hardware.

The invention includes a medium which carries the program used for executing the whole or part of functions of whole or part of means of the environmental load calculation system of the present invention described above by way of a computer, the medium being readable by the computer and the program read out by the computer executing the functions in cooperation with the computer.

The invention includes a medium which carries a program used for executing whole or part of operations of whole or part of steps of the environmental load calculation method and the environmental load indication method of the present invention described above by way of a computer, the medium being readable by the computer and the program read out by the computer executing the functions in cooperation with the computer.

As described above, it is possible to reduce the workload of investigation in assessing a total environmental load from raw material procurements to a production of a component, for example. It is possible to perform the environmental load assessment of a product without devoting much labor even if a large number of components is used for the product. In the case where a component purchaser decides a component to be purchased among a plurality of candidate components, the purchaser can collect/assess the total environmental loads of the components, while component sellers can readily find out results of the environmental loads of the components.

INDUSTRIAL APPLICABILITY

As is apparent from the above descriptions, the present invention has the advantage of propelling the reduction in load to be applied on the earth resource and the global environment.

The invention claimed is:

1. An environmental load calculation system comprising:
a database of storing as data (a) a unit load to be applied on the environment of a constituent material constituting a product and (b) a load ratio of an environmental load of a constituent material constituting a reference product to a total environmental load of the reference product;
input means of inputting information relating to a weight of a constituent material constituting an object product; and
calculation means of calculating a total environmental load of the object product based on the stored data and the inputted information,
wherein the calculation of the total environmental load of the object product based on the stored data and the inputted information consists of (a) a calculation of the total environmental load of the object product based on an environmental load of the constituent material constituting the object product, which is calculated based on the unit load to be applied on the environment of the constituent material constituting the object product and the information relating to the weight of constituent material constituting the object product, and the load ratio of the environmental load of the constituent material constituting the reference product to the total environmental load of the reference product or (b) a calculation of the total environmental load of the object product based on a converted load to be applied on the environment per unit number of the constituent material constituting the object product, which is calculated based on the unit load to be applied on the environment of the constituent material constituting the object product and the load ratio of the environmental load of the constituent material constituting the reference product to the total environmental load of the reference product, and the information relating to the weight of the constituent material constituting the object product.

2. The environmental load calculation system according to claim 1, wherein
the product is a component constituting a product;
the input means is provided in a terminal device provided at the manufacturer and/or the seller which is connected to the calculation means through a network; and
the calculated total environmental load of the product is noticed to the terminal device or devices through the network.

3. The environmental load calculation system according to claim 1, wherein
the product is a component constituting a product,
the environmental load calculation system comprising
additional information input means of inputting additional information relating to at least one of a production, use, transportation and disposal of the product; and
data processing means of calculating the environmental load of the product based on the calculated total environmental load of the product and the inputted additional information.

4. The environmental load calculation system according to claim 1, wherein
the unit load of the constituent material to be applied on the environment is a unit load $u_{L,k}$ relating to an environmental load item L of constituent materials $A_k$ (k=an integer of 1 to m) of a product;
the load ratio is a load ratio $r_L$ relating to the environmental load item L of an environmental load of constituent materials constituting a reference product to a total environmental load of the reference product;
the information relating to a weight is weights $a_k$ (k=an integer of 1 to m) of the constituent materials $A_k$;
the calculation of the total environmental load of the object product based on the stored data and the inputted information consists of (a) a calculation of an environmental load $P_L$ relating to the environmental load item L of the constituent materials constituting the product from $$P_L = \Sigma_{k=1}^{m}(a_k \times u_{L,k}) \quad \text{(Equation 1)}$$

and a calculation of a total environmental load of the product $T_L$ relating to the environmental load item L from $$T_L = P_L / r_L \quad \text{(Equation 2)}$$

or (b) a calculation of a converted environmental load $u_{L,k'}$ relating to the environmental load item L of the constituent materials constituting the product from $$u_{L,k'} = u_{L,k} / r_L \quad \text{(Equation 3)}$$

and a calculation of the total environmental load of the product relating to the environmental load item L from $$T_L = \Sigma_{k=1}^{m}(a_k \times u_{L,k'}) \quad \text{(Equation 4)}.$$

5. The environmental load calculation system according to claim 1, wherein
the unit load of the constituent material to be applied on the environment is a unit load $u_{L,max}$ relating to an environmental load item L of a constituent material $A_{max}$ having a highest ratio of weight among constituent materials of a product;
the load ratio is a load ratio $r2_L$ relating to the environmental load item L of the environmental load of the constituent material $A_{max}$ having the highest ratio to the total environmental load of the reference product;
the information relating to a weight is a weight $a_{max}$ of the constituent material $A_{max}$ having the highest ratio;
the calculation of the total environmental load of the reference product based on the stored data and the inputted information consists of (a) a calculation of the environmental load relating to the environmental load item L of the constituent materials constituting the product from $$P2_L = a_{max} \times u_{L,max}) \quad \text{(Equation 5)}$$

and a calculation of the total environment load relating to the environmental load item L of the product from $$T2_L = P2_L / r2_L \quad \text{(Equation 6)}$$

or (b) a calculation of a converted environmental load $u_{L,max}'$ relating to the environmental load item L per unit load of the constituent materials constituting the product from $$u_{L,max}' = u_{L,max} / r2_L \quad \text{(Equation 7)}$$

and a calculation of the total environmental load of the product relating to the environmental load item L from $$T2_L = a_{max} \times u_{L,max} \quad \text{(Equation 8)}.$$

6. The environmental load calculation system according to claim 1, wherein
the unit load of the constituent material to be applied on the environment is a unit load $u_{L,total}$ of a total of the constituent materials $A_{total}$ of a product relating to an environmental load item L;
the load ratio is a load ratio $r3_L$ relating to the environmental load item L of the environmental load of a constituent material constituting the reference product to the total environmental load of a reference product;
the information relating to a weight is a weight $a_{total}$ of the total of the constituent materials $A_{total}$;
the calculation of the total environmental load of the object product based on the stored data and the inputted information consists of (a) a calculation of the environmental load relating to the environmental load item L of the constituent material constituting the product from $$P3_L = a_{total} \times u_{L,total} \quad \text{(Equation 9)}$$

and a calculation of the total environmental load $T3_L$ relating to the environmental load item L of the product from $$T3_L = P3_L / r3_L \quad \text{(Equation 10)}$$

or (b) a calculation of the converted environmental load relating to the environmental load per unit number $u_{L,total'}$ of the constituent material constituting the product from Equation 11

$$u_{L,total'} = u_{L,total} / r3_L \quad \text{(Equation 11)}$$

and a calculation of the total environmental load $T_L$ of the product relating to the environmental load item L from $$T3_L = a_{total} \times u_{L,total'} \quad \text{(Equation 12)}.$$

7. An environmental load calculation computer implemented method for determining an environmental impact of an object product, the method comprising:
a first step of inputting as data (a) a unit environmental load of a constituent material constituting a product and (b) load ratio of an environmental load of a constituent material constituting a reference product to a total environmental load of the reference product;
a second step of inputting information relating to a weight of a constituent material constituting the object product;
a calculation step of calculating a total environmental load of the object product based on the inputted data and the inputted information; and
a determination step of determining the environmental impact of the object product based on the calculated total environmental load,
wherein the calculation of the total environmental load of the object product based on the stored data and the inputted information consists of (a) a calculation of the total environmental load of the object product based on an environmental load of the constituent material constituting the object product, which is calculated based on the unit load to be applied on the environment of the constituent material constituting the object product and the information relating to the weight of constituent material constituting the object product, and the load ratio of the environmental load of the constituent material constituting the reference product to the total environmental load of the reference product or (b) a calculation of the total environmental load of the object product based on a converted load to be applied on the environment per unit number of the constituent material constituting the object product, which is calculated based on the unit load to be applied on the environment of the constituent material constituting the object product and the load ratio of the environmental load of the constituent material constituting the reference product to the total environmental load of the reference product, and the information relating to the weight of the constituent material constituting the object product.

8. An environmental load indication tag of indicating a total environmental load of a product obtained by the use of the environmental load calculation system of claim 1 or the environmental load calculation method of claim 7.

9. An environmental load indication method of indicating a total environmental load of a product obtained by the use of the environmental load calculation system of claim 1 or the environmental load calculation method of claim 8 on the product or through a network.

10. A recording medium which carries a program to be used for executing whole or part of the first step of inputting as data (a) a unit environmental load of a constituent material constituting a product and (b) load ratio of an environmental load of a constituent material constituting a reference product to a total environmental load of the reference product, the second step of inputting information relating to a weight of a constituent material constituting an object product, and the calculation step of calculating a total environmental load of the object product based on the inputted data and the inputted information by way of a computer, wherein the calculation of the total environmental load of the object product based on the stored data and the inputted information consists of (a) a calculation of the total environmental load of the object product based on an environmental load of the constituent material constituting the object product, which is calculated based on the unit load to be applied on the environment of the constituent material constituting the object product and the information relating to the weight of constituent material constituting the object product, and the load ratio of the environmental load of the constituent material constituting the reference product to the total environmental load of the reference product or (b) a calculation of the total environmental load of the object product based on a converted load to be applied on the environment per unit number of the constituent material constituting the object product, which is calculated based on the unit load to be applied on the environment of the constituent material constituting the object product and the load ratio of the environmental load of the constituent material constituting the reference product to the total environmental load of the reference product, and the information relating to the weight of the constituent material constituting the object product.

* * * * *

UNITED STATES PATENT AND TRADEMARK OFFICE
CERTIFICATE OF CORRECTION

| | | |
|---|---|---|
| PATENT NO. | : 7,010,545 B2 | Page 1 of 1 |
| APPLICATION NO. | : 10/239677 | |
| DATED | : March 7, 2006 | |
| INVENTOR(S) | : Takayoshi Ueno et al. | |

It is certified that error appears in the above-identified patent and that said Letters Patent is hereby corrected as shown below:

Title Page

At (54), line 5 "ENVIRONMENT" should read -- ENVIRONMENTAL --.

Column 23

Line 30, "8" should read --7--.

Signed and Sealed this

Twenty-ninth Day of August, 2006

JON W. DUDAS
*Director of the United States Patent and Trademark Office*